United States Patent
Kashio et al.

(10) Patent No.: US 8,357,261 B2
(45) Date of Patent: Jan. 22, 2013

(54) ADHESIVE MAINLY COMPOSED OF POLYORGANOSILOXANE COMPOUND

(75) Inventors: Mikihiro Kashio, Tokyo (JP); Takashi Tamada, Tokyo (JP)

(73) Assignee: Lintec Corporation, Tokyo (JP)

( * ) Notice: Subject to any disclaimer, the term of this patent is extended or adjusted under 35 U.S.C. 154(b) by 0 days.

(21) Appl. No.: 12/918,127

(22) PCT Filed: Feb. 12, 2009

(86) PCT No.: PCT/JP2009/052272
§ 371 (c)(1),
(2), (4) Date: Nov. 16, 2010

(87) PCT Pub. No.: WO2009/104505
PCT Pub. Date: Aug. 27, 2009

(65) Prior Publication Data
US 2011/0054139 A1    Mar. 3, 2011

(30) Foreign Application Priority Data
Feb. 19, 2008  (JP) .................................. 2008-037425

(51) Int. Cl.
*C09J 183/08*    (2006.01)
(52) U.S. Cl. .......................................... 156/329; 528/36
(58) Field of Classification Search .................. None
See application file for complete search history.

(56) References Cited

U.S. PATENT DOCUMENTS

| | | | |
|---|---|---|---|
| 4,626,556 A | | 12/1986 | Nozue et al. |
| 4,826,943 A | * | 5/1989 | Ito et al. ........................... 528/21 |
| 5,114,757 A | * | 5/1992 | Linde et al. .................... 427/387 |
| 7,759,406 B2 | * | 7/2010 | Kumon et al. .................. 522/99 |
| 2008/0051487 A1 | | 2/2008 | Kumon et al. |
| 2008/0249271 A1 | | 10/2008 | Beppu et al. |

FOREIGN PATENT DOCUMENTS

| | | | |
|---|---|---|---|
| JP | 58-59222 A | | 4/1983 |
| JP | 6-306173 A | | 11/1994 |
| JP | 7-70321 A | | 3/1995 |
| JP | 8-92374 A | | 4/1996 |
| JP | 9-278901 A | | 10/1997 |
| JP | 10-87834 A | | 4/1998 |
| JP | 2002-265609 A | | 9/2002 |
| JP | 2003-49079 A | | 2/2003 |
| JP | 2005-239771 | * | 8/2005 |
| JP | 2008-248236 A | | 10/2008 |
| WO | WO 2005/080459 A1 | | 9/2005 |
| WO | WO 2006/033148 A1 | | 3/2006 |

OTHER PUBLICATIONS

"Studies on the Synthesis and Conductivity of a Nomvel Reactive Ladder-like Poly (β-cyanoethylsilsesquioxane) and Poly [(β-cyanoethylsilsesquioxane)-co-(β-methylsilsesquioxane)]" authored by Zhang et al. and published in Macromol. Chem. Phys. (2002), 203, 2351-2356.*
"Synthesis, Characterization, and Curing Kinetics of Novel Ladder-like Polysilsesquioxanes Containing Side-Chain Maleimide Groups" authored by Krishnan et al. and published in the Journal of Polymer Science, Part: A Polymer Chemistry (2004) 42, 4036-4046.*
"Soluble Ladder Type of Poly(silsesquioxanes)" authored by Yamazaki et al. and published in Contemporary Topics in Polymer Science (1984) 4, 105-113.*
International Search Report, dated May 19, 2009, issued in corresponding international application PCT/JP2009/052272.

* cited by examiner

*Primary Examiner* — Marc Zimmer
(74) *Attorney, Agent, or Firm* — Birch, Stewart, Kolasch & Birch, LLP

(57) ABSTRACT

Disclosed is an adhesive characterized by containing a ladder polysilsesquioxane having a repeating unit represented by formula (I) in a molecule. The adhesive contains a specific ladder polysilsesquioxane, and exhibits good adhesion to metals or synthetic resins. (In the formula, A represents a single bond or a linking group; $R^1$ represents a hydrogen atom or the like; $X^0$ represents a halogen atom, a group represented by the following formula: OG (wherein G represents a protecting group of a hydroxy group) or a cyano group; $R^2$ represents an optionally substituted phenyl group, a $C_{1-20}$ alkyl group which may have a substituent (excluding a halogen atom, a group represented by the formula: OG and a cyano group) or the like; and l, m and n each represents 0 or a natural number, provided that l and n are not 0 at the same time.)

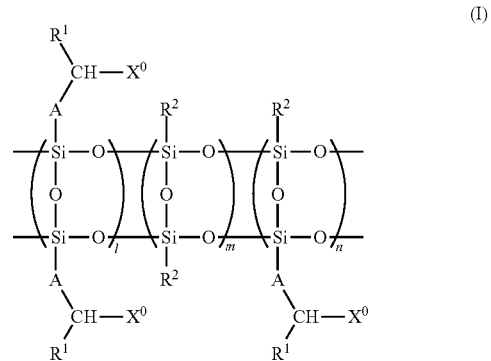

(I)

7 Claims, No Drawings

ADHESIVE MAINLY COMPOSED OF POLYORGANOSILOXANE COMPOUND

TECHNICAL FIELD

The present invention relates to an adhesive that includes a specific polyorganosiloxane compound as the main component, and firmly bonds a metal, a synthetic resin, or the like.

BACKGROUND ART

A printed circuit board in which a conductor circuit is formed on the surface of an insulating substrate has been widely used for electronic components and semiconductor devices. In recent years, an increase in density and a decrease in size of conductor circuits has been desired for printed circuit boards along with a demand for a decrease in size and an improvement in functions of electronic instruments.

In order to deal with this demand, a semi-additive method has been proposed as a method of producing a high-density printed circuit board. The semi-additive method includes subjecting the surface of an insulating substrate made of a synthetic resin to electroless copper plating, and etch-removing a copper foil layer formed by electroless plating to form a circuit pattern. It is possible to accurately form a minute circuit pattern by the semi-additive method.

However, the semi-additive method has the following drawbacks. Specifically, the copper foil layer formed between the insulating substrate and the circuit pattern by electroless plating substantially does not exhibit adhesion to the insulating substrate. Therefore, although adhesion between the circuit pattern and the insulating substrate is maintained due to the anchor effect of the copper foil layer when the surface of the insulating substrate has a relatively large roughness, adhesion between the circuit pattern and the insulating substrate is insufficient when the insulating substrate has a flat surface. In this case, the conductor circuit exhibits insufficient adhesion to the substrate.

A method which roughens the surface of the insulating substrate to increase adhesion of the conductor circuit has been proposed (Patent Document 1, etc.). Specifically, this method forms minute elevations and depressions on the surface of the insulating substrate.

However, when forming a more minute circuit pattern using this method, a high-density, super-fine circuit lines are affected by elevations and depressions formed on the surface of the insulating substrate. This may make it difficult to form a high-density conductor circuit.

In recent years, since a decrease in size and an increase in density of a circuit formed on a printed circuit board have been desired, a circuit-forming technique which does not decrease adhesion even when using an insulating substrate having a flat surface has been strongly desired.

A polyorganosiloxane compound having a ladder structure has been known as a polymer which forms a thin film which exhibits excellent hardness, heat resistance, weather resistance, and the like (Patent Documents 2 to 5, etc.). Patent Document 6 discloses that a resin composition containing a polyorganosiloxane compound having a hydroxyl group, an acrylic copolymer resin having an alcoholic hydroxyl group, and a polyisocyanate compound exhibits excellent adhesion to a metal (particularly aluminum).

However, Patent Documents 2 to 6 do not disclose that a polyorganosiloxane compound having a ladder structure serves as an adhesive which firmly bonds a metal or a synthetic resin.

Patent Document 1: JP-A-2003-49079
Patent Document 2: JP-A-58-59222
Patent Document 3: JP-A-7-70321
Patent Document 4: JP-A-8-92374
Patent Document 5: JP-A-6-306173
Patent Document 6: JP-A-10-87834

DISCLOSURE OF THE INVENTION

Problems to be Solved by the Invention

An object of the present invention is to provide an adhesive which includes a specific polyorganosiloxane compound as the main component, and firmly bonds a metal, a synthetic resin, and the like.

Means for Solving the Problems

The inventors conducted extensive studies in order to achieve the above object. The inventors synthesized a polyorganosiloxane compound by polycondensation of an alkoxysilane compound which has a specific functional group at the molecular terminal, such as 3-acetoxypropyltrimethoxysilane, 3-chloropropyltrimethoxysilane, or 2-cyanoethyltrimethoxysilane. The inventors found that a cured product of this polyorganosiloxane compound firmly bonds a metal, a synthetic resin, and the like. This finding has led to the completion of the present invention.

The present invention provides the following adhesives ((1) to (7)).

(1) An adhesive comprising a polysilsesquioxane compound having a ladder structure including a repeating unit shown by the following formula (I) in the molecule,

[Chemical Formula 1]

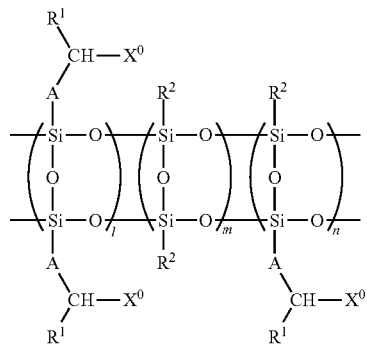

(I)

wherein A represents a single bond or a linking group, $R^1$ represents a hydrogen atom or an alkyl group having 1 to 6 carbon atoms, $X^0$ represents a halogen atom, a group shown by OG (wherein G represents a protecting group for a hydroxyl group), or a cyano group, $R^2$ represents a substituted or unsubstituted phenyl group, an alkyl group having 1 to 20 carbon atoms which may have a substituent (excluding a halogen atom, the group shown by OG, and a cyano group), or an alkenyl group having 2 to 20 carbon atoms, l, m, and n are individually 0 or an arbitrary natural number, provided that l and n are not 0 at the same time, A and A, $X^0$ and $X^0$, $R^1$ and $R^2$, $R^2$ and $R^2$ may be either the same or different from each other, and when l, m, and n are 2 or more, the repeating units shown by the following formulas (i), (ii), and (iii) may be either the same or different from each other.

[Chemical Formula 2]

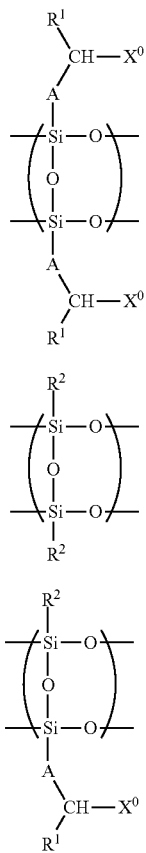

(2) The adhesive according to (1), wherein the polyorganosiloxane compound is obtained by reacting a silane compound (1) shown by $X^0$—$CH(R^1)$-A-$Si(OR^3)_p(X^1)_{3-p}$ (wherein $X^0$, $R^1$, and A are the same as defined above, $R^3$ represents an alkyl group having 1 to 6 carbon atoms, $X^1$ represents a halogen atom, and p is an integer from 0 to 3) and a silane compound (2) shown by $R^2Si(OR^4)_q(X^2)_{3-q}$ (wherein $R^2$ is the same as defined above, $R^4$ represents an alkyl group having 1 to 6 carbon atoms, $X^2$ represents a halogen atom, and q is an integer from 0 to 3) in a molar ratio of 5:95 to 100:0 (=silane compound (1):silane compound (2)) in the presence of a catalyst.

(3) An adhesive comprising a polyorganosiloxane compound as a main component, the polyorganosiloxane compound being obtained by reacting a silane compound (1) shown by $X^0$—$CH(R^1)$-A-$Si(OR^3)_p(X^1)_{3-p}$ (wherein $X^0$, $R^1$, and A are the same as defined above, $R^3$ represents an alkyl group having 1 to 6 carbon atoms, $X^1$ represents a halogen atom, and p is an integer from 0 to 3) and a silane compound (2) shown by $R^2Si(OR^4)_q(X^2)_{3-q}$ (wherein $R^2$ is the same as defined above, $R^4$ represents an alkyl group having 1 to 6 carbon atoms, $X^2$ represents a halogen atom, and q is an integer from 0 to 3) in a molar ratio of 5:95 to 100:0 (=silane compound (1):silane compound (2)) in the presence of a catalyst.

(4) The adhesive according to any one of (1) to (3), wherein A represents an alkylene group having 1 to 10 carbon atoms.

(5) The adhesive according to any one of (1) to (4), wherein $X^0$ represents a chlorine atom, an acetoxy group, or a cyano group.

(6) The adhesive according to any one of (1) to (5), wherein the adhesive is used to bond at least one material selected from the group consisting of glass, a ceramic, a metal, and a synthetic resin.

(7) The adhesive according to (6), wherein the metal is at least one metal selected from the group consisting of copper, aluminum, gold, platinum, and alloys thereof.

EFFECTS OF THE INVENTION

The adhesive according to the present invention can firmly bond glass, ceramics, metals, synthetic resins, and the like.

BEST MODE FOR CARRYING OUT THE INVENTION

The present invention is described in detail below.

1) Adhesive

The adhesive according to the present invention includes (i) a polyorganosiloxane compound having a ladder structure including a repeating unit shown by the formula (I) in the molecule (hereinafter may be referred to as "polyorganosiloxane compound (I)"), or (ii) a polyorganosiloxane compound obtained by reacting a silane compound (1) shown by $X^0$—$CH(R^1)$-A-$Si(OR^3)_p(X^1)_{3-p}$ (wherein $X^0$, $R^1$, and A are the same as defined above, $R^3$ represents an alkyl group having 1 to 6 carbon atoms, $X^1$ represents a halogen atom, and p is an integer from 0 to 3) and a silane compound (2) shown by $R^2Si(OR^4)_q(X^2)_{3-q}$ (wherein $R^2$ is the same as defined above, $R^4$ represents an alkyl group having 1 to 6 carbon atoms, $X^2$ represents a halogen atom, and q is an integer from 0 to 3) in a molar ratio of 5:95 to 100:0 (silane compound (1):silane compound (2)) in the presence of a catalyst (hereinafter may be referred to as "polyorganosiloxane compound (Ia)"), as the main component.

In the adhesive according to the present invention, the expression "including the polyorganosiloxane compound (I) or the polyorganosiloxane compound (Ia) as the main component" means that the adhesive includes one or more polyorganosiloxane compounds (I) or polyorganosiloxane compounds (Ia), and may further include other additive components described later insofar as the object of the present invention is not impaired.

The amount of the polyorganosiloxane compound (I) or the polyorganosiloxane compound (Ia) in the adhesive according to the present invention is normally 70 wt % or more, preferably 80 wt % or more, and more preferably 90 wt % or more, based on the total amount of the adhesive.

A in the formula (I) represents a single bond or a linking group.

Examples of the linking group include a substituted or unsubstituted alkylene group, a substituted or unsubstituted arylene group, a combination of a substituted or unsubstituted alkylene group and a substituted or unsubstituted arylene group, and the like.

Examples of the alkylene group of the substituted or unsubstituted alkylene group include an alkylene group having 1 to 10 carbon atoms such as a methylene group, an ethylene group, a propylene group, a trimethylene group, a tetramethylene group, a pentamethylene group, and a hexamethylene group; an alkylene group having 2 to 10 carbon atoms which includes an unsaturated bond such as a vinylene group, a propenylene group, a butenylene group, and a pentenylene group; and the like.

Examples of the arylene group of the substituted or unsubstituted arylene group include an o-phenylene group, an m-phenylene group, a p-phenylene group, a 2,6-naphthylene group, and the like.

Examples of a substituent for the alkylene group include an alkoxy group such as a methoxy group and ethoxy group; an alkylthio group such as a methylthio group and an ethylthio group; an alkoxycarbonyl group such as a methoxycarbonyl group and an ethoxycarbonyl group; and the like.

Examples of a substituent for the arylene group include a cyano group; a nitro group; a halogen atom such as a fluorine atom, a chlorine atom, and a bromine atom; an alkyl group such as a methyl group and an ethyl group; an alkoxy group such as a methoxy group and an ethoxy group; an alkylthio group such as a methylthio group and an ethylthio group; and the like.

The substituent may be bonded to an arbitrary position of the alkylene group or the arylene group. A plurality of substituents, either the same or different, may be bonded to the alkylene group or the arylene group.

Examples of a combination of a substituted or unsubstituted alkylene group and a substituted or unsubstituted arylene group include a group in which at least one substituted or unsubstituted alkylene group and at least one substituted or unsubstituted arylene group are linearly bonded. Specific examples include groups shown by the following formulas.

[Chemical Formula 3]

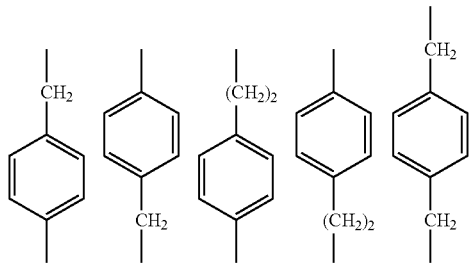

Among these groups, an alkylene group having 1 to 6 carbon atoms, particularly an ethylene group, is preferable as A due to capability of producing an adhesive with excellent adhesion with glass, ceramics, a metal, and a synthetic resin.

$R^1$ represents a hydrogen atom or an alkyl group having 1 to 6 carbon atoms such as a methyl group, an ethyl group, an n-propyl group, an isopropyl group, an n-butyl group, a sec-butyl group, an isobutyl group, a tert-butyl group, an n-pentyl, and an n-hexyl group. A hydrogen atom is preferred.

$X^0$ represents a halogen atom such as a fluorine atom, a chlorine atom, a bromine atom, and an iodine atom; a group shown by OG; or a cyano group.

G represents a protecting group for a hydroxyl group. As the protecting group for a hydroxyl group, a generally known protecting group can be used without particular limitation. For example, an acyl-type protecting group; a silyl-type protecting group such as a trimethylsilyl group, a triethylsilyl group, a tert-butyldimethylsilyl group, and a tert-butyldiphenylsilyl group; an acetal-type protecting group such as a methoxymethyl group, a methoxyethoxymethyl group, a 1-ethoxyethyl group, a tetrahydropyran-2-yl group, and a tetrahydrofuran-2-yl group; an alkoxycarbonyl-type protecting group such as a tert-butoxycarbonyl group; an ether-type protecting group such as a methyl group, an ethyl group, a tert-butyl group, an octyl group, an allyl group, a triphenylmethyl group, a benzyl group, a p-methoxybenzyl group, a fluorenyl group, a trityl group, and a benzhydryl group; and the like can be given. Among these, an acyl-type protecting group is preferable.

An acyl-type protecting group is specifically a group shown by —C(=O)$R^5$. In the formula, $R^5$ represents an alkyl group having 1 to 6 carbon atoms such as a methyl group, an ethyl group, an n-propyl group, an iso-propyl group, an n-butyl group, an iso-butyl group, a sec-butyl group, a tert-butyl group, an n-pentyl group, or a substituted or unsubstituted phenyl group.

Examples of a substituent for the substituted or unsubstituted phenyl group represented by $R^5$ include an alkyl group such as a methyl group, an ethyl group, an n-propyl group, an isopropyl group, an n-butyl group, a sec-butyl group, an isobutyl group, a tert-butyl group, an n-pentyl group, an n-hexyl group, an n-heptyl group, an n-octyl group, and isooctyl group; a halogen atom such as a fluorine atom and a chlorine atom, and a bromine atom; an alkoxy group such as a methoxy group and an ethoxy group; and the like can be given.

Among these groups, a chlorine atom, a group shown by OG (wherein G represents an acyl-type protecting group), or a cyano group, particularly a chlorine atom, an acetoxy group, or a cyano group, is preferable as $X^0$ due to capability of producing an adhesive with excellent adhesion with glass, ceramics, a metal, and a synthetic resin.

$R^2$ represents a substituted or unsubstituted phenyl group, an alkyl group having 1 to 20 carbon atoms which may have a substituent (excluding a halogen atom, a group shown by OG, and a cyano group), or an alkenyl group having 2 to 20 carbon atoms.

Examples of a substituent for the phenyl group which may have a substituent represented by $R^2$ include an alkyl group such as a methyl group, an ethyl group, an n-propyl group, an isopropyl group, an n-butyl group, a sec-butyl group, an isobutyl group, a tert-butyl group, an n-pentyl group, an n-hexyl group, an n-heptyl group, an n-octyl group, and an isooctyl group; an alkoxy group such as a methoxy group and an ethoxy group; a halogen atom such as a fluorine atom and a chlorine atom; and the like.

Specific examples of the substituted or unsubstituted phenyl group represented by $R^2$ include a phenyl group, a 2-chlorophenyl group, a 4-methylphenyl group, a 3-ethylphenyl group, a 2-methoxyphenyl group, and the like.

Examples of the alkyl group having 1 to 20 carbon atoms represented by $R^2$ include a methyl group, an ethyl group, an n-propyl group, an isopropyl group, an n-butyl group, a sec-butyl group, an isobutyl group, a tert-butyl group, an n-pentyl group, an n-hexyl group, an n-heptyl group, an n-octyl group, an isooctyl group, an n-nonyl group, an n-decyl group, and n-dodecyl group.

Examples of a substituent for an alkyl group having 1 to 20 carbon atoms represented by $R^2$ include a glycidyl group, a glycidoxy group, an epoxy group, a 3,4-epoxycyclohexyl group, an acryloxy group, a methacryloxy group, a mercapto group, a carboxyl group, an acetylacetonyl group; a substituted or unsubstituted amino group such as an amino group, an aminoethylamino group, and a phenylamino group; and the like.

Examples of the alkenyl group having 2 to 20 carbon atoms include a vinyl group, an isopropenyl group, an allyl group, and the like.

l, m, and n are individually 0 or an arbitrary natural number, provided that l and n are not 0 at the same time, because a group shown by $X^0$—CH(R')-A-(wherein $X^0$, $R^1$, and A are the same as defined above) is essential for the compound used in the present invention in order to achieve its object.

A, $X^0$, $R^1$, and $R^2$ may be either the same or different from each other, and further when l, m, and n are 2 or more, the groups shown by the formulas (i), (ii), and (iii) may be either the same or different from each other.

Among the repeating units in the polyorganosiloxane compound (I), a repeating unit shown by the formula (i) or a repeating unit shown by the formula (iii) is essential.

The polyorganosiloxane compound (I) may be a homopolymer of one type of repeating unit shown by the formula (i) or the formula (iii), a copolymer of two or more repeating units shown by the formula (i) and/or the formula (iii), or a copolymer of at least one repeating unit shown by the formula (i) and/or the formula (iii) and a repeating unit shown by the formula (ii). The repeating unit shown by the formula (iii) may bond in the polymer in an inverted form (upside down).

When the polyorganosiloxane compound (I) is a copolymer, such a copolymer may be any (co)polycondensate such as a random (co)polymer, a partial block (co)polymer, or a complete block (co)polymer.

Although not particularly limited, the polyorganosiloxane compound (I) is preferably obtained by a method of reacting a silane compound (1) shown by $X^0$—$CH(R^1)$-A-$Si(OR^3)_p$ $(X^1)_{3-p}$ and a silane compound (2) shown by $R^2Si(OR^4)_q$ $(X^2)_{3-q}$ in a molar ratio of 5:95 to 100:0 in the presence of a specific amount of a catalyst.

The polyorganosiloxane compound (Ia) is obtained by reacting a silane compound (1) shown by N≡C—$CH(R^1)$-A-$Si(OR^3)_p(X^1)_{3-p}$ (wherein $R^1$ and A are the same as defined above, $R^3$ represents an alkyl group having 1 to 6 carbon atoms, $X^1$ represents a halogen atom, and p is an integer from 0 to 3) and a silane compound (2) shown by $R^2Si(OR^4)_q$ $(X^2)_{3-q}$ (wherein $R^2$ is the same as defined above, $R^4$ represents an alkyl group having 1 to 6 carbon atoms, $X^2$ represents a halogen atom, and q is an integer from 0 to 3) in a molar ratio of 5:95 to 100:0 in the presence of a specific amount of a catalyst.

$X^0$, A, and $R^1$ in the formula (1) and $R^2$ in the formula (2) have the same meanings as defined above.

$R^3$ in the formula (1) represents the same alkyl group having 1 to 6 carbon atoms previously motioned for the alkyl group having 1 to 6 carbon atoms represented by $R^1$. Among the alkyl groups, a methyl group and an ethyl group are preferable from the viewpoint of economy, a high yield of the target compound, and the like.

$X^1$ represents a halogen atom such as a fluorine atom, a chlorine atom, or a bromine atom.

p is an integer from 0 to 3. When p is 2 or more, two or more $OR^3$ groups may be the same or different. When (3−p) is 2 or more, two or more $X^1$ may be either the same or different.

Specific examples of the silane compound (1) include trialkoxysilane compounds in which $X^0$ is a halogen atom such as chloromethyltrimethoxysilane, bromomethyltriethoxysilane, 2-chloroethyltripropoxysilane, 2-bromoethyltributoxysilane, 3-chloropropyltrimethoxysilane, and 3-chloropropyltriethoxysilane,
3-chloropropyltripropoxysilane, 3-chloropropyltributoxysilane, 3-bromopropyltrimethoxysilane, 3-bromopropyltriethoxysilane, 3-bromopropyltripropoxysilane, 3-bromopropyltributoxysilane,
3-fluoropropyltrimethoxysilane, 3-fluoropropyltriethoxysilane, 3-fluoropropyltripropoxysilane, 3-fluoropropyltributoxysilane, 3-iodopropyltrimethoxysilane, 2-chloroethyltrimethoxysilane, 3-chloropropyltriethoxysilane, 4-chlorobutyltripropoxysilane, 5-chloropentyltripropoxysilane, 2-chloropropyltrimethoxysilane, 3-chloro-3-acetylpropyltrimethoxysilane, 3-chloro-3-methoxycarbonylpropyltrimethoxysilane, o-(2-chloroethyl)phenyltripropoxysilane, m-(2-chloroethyl)phenyltrimethoxysilane, p-(2-chloroethyl)phenyltriethoxysilane, and p-(2-fluoroethyl)phenyltrimethoxysilane;

halogenosilane compounds in which $X^0$ is a halogen atom such as chloromethyltrichlorosilane, bromomethylbromodimethoxysilane, 2-chloroethyldichloromethoxysilane, 2-bromoethyldichloroethoxysilane, 3-chloropropyltrichlorosilane, 3-chloropropyltribromosilane, 3-chloropropyldichloromethoxysilane, 3-chloropropyldichloroethoxysilane, 3-chloropropylchlorodimethoxysilane, 3-chloropropylchlorodiethoxysilane, 3-bromopropyldichloroethoxysilane,
3-bromopropyltribromosilane, 3-bromopropyltrichlorosilane, 3-bromopropylchlorodimethoxysilane, 3-fluoropropyltrichlorosilane, 3-fluoropropylchlorodimethoxysilane, 3-fluoropropyldichloromethoxysilane, 3-fluoropropylchlorodiethoxysilane, 3-iodopropyltrichlorosilane, 4-chlorobutylchlorodiethoxysilane, 3-chloro-n-butylchlorodiethoxysilane, 3-chloro-3-acetylpropyldichloroethoxysilane, and 3-chloro-3-methoxycarbonylpropyltribromosilane;

trialkoxysilane compounds in which $X^0$ is a group shown by OG such as 3-acetoxypropyltrimethoxysilane, 3-acetoxypropyltriethoxysilane, 3-acetoxypropyltripropoxysilane, 3-acetoxypropyltributoxysilane, 3-propionyloxypropyltrimethoxysilane, 3-propionyloxypropyltriethoxysilane, 3-benzoyloxypropyltrimethoxysilane, 3-benzoyloxypropyltriethoxysilane, 3-benzoyloxypropyltripropoxysilane, 3-benzoyloxypropyltributoxysilane, 2-trimethylsilyloxyethyltrimethoxysilane, 3-triethylsilyloxypropyltriethoxysilane, 3-(2-tetrahydropyranyloxy)propyltripropoxysilane, 3-(2-tetrahydrofuranyloxy)propyltributoxysilane,
3-methoxymethyloxypropyltrimethoxysilane, 3-methoxyethoxymethyloxypropyltriethoxysilane, 3-(1-ethoxyethyloxy)propyltripropoxysilane, 3-(tert-butoxycarbonyloxy)propyltrimethoxysilane, 3-tert-butoxypropyltrimethoxysilane,
3-benzyloxypropyltriethoxysilane, and 3-triphenylmethoxypropyltriethoxysilane;

halogenosilane compounds in which $X^0$ is a group shown by OG such as 3-acetoxypropyltrichlorosilane, 3-acetoxypropyltribromosilane, 3-acetoxypropyldichloromethoxysilane, 3-acetoxypropyldichloroethoxysilane, 3-acetoxypropylchlorodimethoxysilane,
3-acetoxypropylchlorodiethoxysilane, 3-benzoyloxypropyltrichlorosilane, 3-trimethylsilyloxypropylchlorodimethoxysilane, 3-triethylsilyloxypropyldichloromethoxysilane, 3-(2-tetrahydropyranyloxy)propylchlorodiethoxysilane, 3-(2-tetrahydrofuranyloxy)propyldichloroethoxysilane,
3-methoxymethyloxypropyltribromosilane, 3-methoxyethoxymethyloxypropyltrichlorosilane, 3-(1-ethoxyethyloxy)propylchlorodimethoxysilane, 3-tert-butoxycarbonyloxypropyldichloromethoxysilane,
3-tert-butoxypropylchlorodiethoxysilane, 3-triphenylmethoxypropyldichloroethoxysilane, and 3-benzyloxypropyltribromosilane;

trialkoxysilane compounds in which $X^0$ is a cyano group such as cyanomethyltrimethoxysilane, cyanomethyltriethoxysilane, 1-cyanoethyltrimethoxysilane, 2-cyanoethyltrimethoxysilane, 2-cyanoethyltriethoxysilane, 2-cyanoethyltripropoxysilane, 3-cyanopropyltrimethoxysilane, 3-cyanopropyltriethoxysilane, 3-cyanopropyltripropoxysilane, 3-cyanopropyltributoxysilane, 4-cyanobutyltrimethoxysilane, 5-cyanopentyltrimethoxysilane, 2-cyanopropyltrimethoxysilane, 2-(cyanomethoxy)

ethyltrimethoxysilane, 2-(2-cyanoethoxy)ethyltrimethoxysilane, o-(cyanomethyl)phenyltripropoxysilane, m-(cyanomethyl)phenyltrimethoxysilane, p-(cyanomethyl)phenyltriethoxysilane, and p-(2-cyanoethyl)phenyltrimethoxysilane;

halogenosilane compounds in which $X^0$ is a cyano group such as cyanomethyltrichlorosilane, cyanomethylbromodimethoxysilane, 2-cyanoethyldichloromethoxysilane, 2-cyanoethyldichloroethoxysilane, 3-cyanopropyltrichlorosilane, 3-cyanopropyltribromosilane, 3-cyanopropyldichloromethoxysilane, 3-cyanopropyldichloroethoxysilane, 3-cyanopropylchlorodimethoxysilane, 3-cyanopropylchlorodiethoxysilane, 4-cyanobutylchlorodiethoxysilane, 3-cyano-n-butylchlorodiethoxysilane, 2-(2-cyanoethoxy)ethyltrichlorosilane, 2-(2-cyanoethoxy)ethylbromodiethoxysilane, 2-(2-cyanoethoxy)ethyldichloropropoxysilane, o-(2-cyanoethyl)phenyltrichlorosilane, m-(2-cyanoethyl)phenylmethoxydibromosilane, p-(2-cyanoethyl)phenyldimethoxychlorosilane, and p-(2-cyanoethyl)phenyltribromosilane; and the like can be given.

These silane compounds (1) may be used either individually or in combination.

Of the above groups, a trialkoxysilane compound having 3-chloropropyl group, a 3-acetoxy propyl group, a 2-cyanoethyl group, or a 3-cyanopropyl group, particularly a 3-chloropropyl group, a 3-acetoxypropyl group, or a 2-cyanoethyl group, is preferable as the silane compound (1) due to capability of producing an adhesive with excellent adhesion with glass, ceramics, a metal, and a synthetic resin.

In the formula (2), $R^4$ represents the same alkyl groups having 1 to 6 carbon atoms as $R^3$, and $X^2$ represents the same halogen atoms as $X^1$ previously described.

q is an integer from 0 to 3. When q is 2 or more, two or more groups represented by $OR^4$ may be either the same or different. When (3−q) is 2 or more, two or more $X^2$ may be either the same or different.

Specific examples of the silane compound (2) include substituted or unsubstituted phenylsilane compounds such as phenyltrimethoxysilane, 4-methoxyphenyltrimethoxysilane, 2-chlorophenyltrimethoxysilane, phenyltriethoxysilane, 2-methoxyphenyltriethoxysilane, phenyldimethoxyethoxysilane, phenyldiethoxymethoxysilane, phenyltrichlorosilane, phenylchlorodimethoxysilane, phenyldichloromethoxysilane, phenyltribromosilane, phenylchloromethoxyethoxysilane, 4-methoxyphenyltrichlorosilane, 2-chlorophenyltrichlorosilane, phenyltrichlorosilane, and 2-ethoxyphenyltrichlorosilane;

alkylsilane compounds such as methyltrimethoxysilane, methyltriethoxysilane, ethyltrimethoxysilane, ethyltriethoxysilane, n-propyltrimethoxysilane, n-butyltriethoxysilane, i-butyltrimethoxysilane, n-pentyltriethoxysilane, n-hexyltrimethoxysilane, i-octyltriethoxysilane, dodecyltrimethoxysilane, methyldimethoxyethoxysilane, methyldiethoxymethoxysilane, methyltrichlorosilane, methylchlorodimethoxysilane, methyldichloromethoxysilane, methyldichloromethoxysilane, methyltribromosilane, methylchlorodiethoxysilane, ethyltrichlorosilane, ethylchlorodimethoxysilane, ethyldichloromethoxysilane, ethyltribromosilane, n-propyltrichlorosilane, n-propylchlorodimethoxysilane, and n-propyldichloromethoxysilane;

substituted alkylsilane compounds such as glycidyltrimethoxysilane, glycidyltriethoxysilane, glycidyltripropoxysilane, glycidyltributoxysilane, glycidyltrichlorosilane, glycidylchlorodimethoxysilane, glycidyldichloromethoxysilane, glycidylchlorodiethoxysilane, glycidyldichloroethoxysilane, glycidyltribromosilane, 3-glycidoxypropyltrimethoxysilane, 3-glycidoxypropyltriethoxysilane, 3-glycidoxypropyltripropoxysilane, 3-glycidoxypropyltributoxysilane, 3-glycidoxypropyltrichlorosilane, 3-glycidoxypropylchlorodimethoxysilane, 3-glycidoxypropyldichloromethoxysilane, 3-glycidoxypropylchlorodiethoxysilane, 3-glycidoxypropyldichloroethoxysilane, 3-glycidoxypropyltribromosilane, 2-(3,4-epoxycyclohexyl)ethyltrimethoxysilane, 2-(3,4-epoxycyclohexyl)ethyltriethoxysilane, 2-(3,4-epoxycyclohexyl)ethyltripropoxysilane, 2-(3,4-epoxycyclohexyl)ethyltributoxysilane, 3-acryloxypropyltrimethoxysilane, 3-acryloxypropyltriethoxysilane, 3-acryloxypropyltripropoxysilane, 3-acryloxypropyltributoxysilane, 3-methacryloxypropyltrimethoxysilane, 3-methacryloxypropyltriethoxysilane, 3-methacryloxypropyltripropoxysilane, 3-methacryloxypropyltributoxysilane, 3-methacryloxypropyltrichlorosilane, 3-methacryloxypropylchlorodimethoxysilane, 3-methacryloxypropyldichloromethoxysilane, 3-methacryloxypropylchlorodiethoxysilane, 3-methacryloxypropyldichloroethoxysilane, 3-methacryloxypropyltribromosilane, 3-[(2-aminoethyl)amino]propyltrimethoxysilane, 3-aminopropyltrimethoxysilane, 3-phenylaminopropyltrimethoxysilane, 3-carboxypropyltrimethoxysilane, 3-mercaptopropyltrimethoxysilane, 3-mercaptopropyltriethoxysilane, 3-mercaptopropyltripropoxysilane, 3-mercaptopropyltributoxysilane, 3-mercaptopropyltrichlorosilane, 3-mercaptopropylchlorodimethoxysilane, 3-mercaptopropyldichloromethoxysilane, 3-mercaptopropylchlorodiethoxysilane, 3-mercaptopropyldichloroethoxysilane, and 3-mercaptopropyltribromosilane;

alkenylsilane compounds such as vinyltrimethoxysilane, vinyltriethoxysilane, vinyltripropoxysilane, vinyltributoxysilane, and allyltrimethoxysilane;

These silane compounds (2) may be used either individually or in combination.

The molar ratio of the silane compound (1) to the silane compound (2) can be arbitrary determined within a range of 5:95 to 100:0, but is preferably 20:80 to 70:30, and more preferably 25:75 to 60:40. A polyorganosiloxane compound which can produce a cured product with excellent adhesion can be obtained in a high yield by using the silane compound (1) and silane compound (2) in a ratio within the above ranges.

An acid catalyst or a base catalyst can be used as a catalyst for the reaction of the silane compound (1) and the silane compound (2).

Examples of the acid catalyst include an inorganic acid such as hydrochloric acid, sulfuric acid, nitric acid, and phosphoric acid and an organic acid such as methanesulfonic acid, trifluoromethanesulfonic acid, benzensulfonic acid, p-toluenesulfonic acid, acetic acid, and trifluoroacetic acid.

Examples of the base catalyst include organic bases such as trimethylamine, triethylamine, lithium diisopropylamide, lithium bis(trimethylsilyl)amide, pyridine, 1,8-diazabicyclo[5.4.0]-7-undecene, aniline, picoline, 1,4-diazabicyclo[2.2.2]octane, and imidazole; organic base hydroxides such as tetramethylammonium hydroxide and tetraethylammonium hydroxide; metal alcoholates such as sodium methoxide, sodium ethoxide, sodium tert-butoxide, and potassium tert-butoxide; metal hydrides such as sodium hydride and calcium hydride; metal hydroxides such as sodium hydroxide, potassium hydroxide, and calcium hydroxide; metal carbonates such as sodium carbonate, potassium carbonate, and magnesium carbonate; metal hydrogencarbonates such as sodium hydrogencarbonate, and potassium hydrogencarbonate; and the like.

The amount of the catalyst used is normally 0.1 to 10 mol %, and preferably 1 to 5 mol % of the total molar content of the silane compound (1), or the silane compound (1) and the silane compound (2) (hereinafter referred to simply as "silane compounds" from time to time).

There are no particular limitations to the method for reacting the silane compound (1) and silane compound (2). For example, a method of adding the catalyst to a solution of the silane compound (1) and silane compound (2) and stirring the mixture at a specified temperature can be given.

The solvent used for the reaction can be appropriately selected according to the type of the silane compounds and the like used in the reaction. Examples of the solvent include water; an aromatic hydrocarbon such as benzene, toluene, and xylene; an ester such as methyl acetate, ethyl acetate, propyl acetate, and methyl propionate; a ketone such as acetone, methyl ethyl ketone, methyl isobutyl ketone, and cyclohexanone; an alcohol such as methyl alcohol, ethyl alcohol, n-propyl alcohol, isopropyl alcohol, n-butyl alcohol, isobutyl alcohol, sec-butyl alcohol, and tert-butyl alcohol; and the like. These solvents may be used either individually or in combination.

Among these, water, aromatic hydrocarbons, and a mixture thereof are preferable, with a particularly preferable solvent being a mixture of water and toluene. When water and toluene are used, the ratio (volume ratio) of water to toluene is preferably 1:9 to 9:1 and more preferably 7:3 to 3:7.

The solvent is used in an amount of 1 liter for normally 0.1 to 10 mol, and preferably 0.5 to 10 mol of the silane compounds.

The reaction temperature of the silane compounds is normally in the range from 0° C. to the boiling point of the solvent used, and preferably in the range of 20° C. to 100° C. If the temperature is too low, the reaction proceeds only insufficiently. On the other hand, if the temperature is too high, inhibition of gel production is difficult. The reaction time is normally from 30 minutes to 20 hours.

After the reaction, the reaction is neutralized by adding an aqueous solution of an alkali such as sodium hydrogencarbonate when an acid catalyst is used or an acid such as a hydrogen chloride when a base catalyst is used. A salt produced in this instance is removed by filtration, washing, or the like to obtain the target polyorganosiloxane compound (I) and polyorganosiloxane compound (Ia) (the polyorganosiloxane compound (I) and polyorganosiloxane compound (Ia) may be hereinafter collectively referred to from time to time as "polyorganosiloxane compound (1) and the like").

Whether or not the polyorganosiloxane compound (I) and the like have a ladder structure may be confirmed by measuring the infrared absorption spectrum or X-ray diffraction of the reaction product, for example.

The weight average molecular weight (Mw) of the polyorganosiloxane compound (I) and the like is normally 1,000 to 30,000, and preferably 1,500 to 10,000. The number average molecular weight may be measured by size exclusion chromatography (SEC) as a polystyrene-reduced number average molecular weight, for example.

The molecular weight distribution (Mw/Mn) of the polyorganosiloxane compound (I) is not particularly limited. The molecular weight distribution is normally 1.0 to 3.0, and preferably 1.1 to 2.0.

An adhesive according to the present invention contains one or more polyorganosiloxane compound (I) and the like.

The adhesive according to the present invention may consist only of a polyorganosiloxane compound (I) and the like or may be a composition obtained by adding other components to the polyorganosiloxane compound (I) and the like to the extent that the object of the present invention is not impaired.

Although the adhesive according to the present invention includes the polyorganosiloxane compound (I) or the like having a ladder structure as the main component, the adhesive may also include a polyorganosiloxane compound having a random structure or a basket structure insofar as the effects of the present invention are not impaired.

The amount of the polyorganosiloxane compound (I) and the like in the adhesive according to the present invention is normally 60 wt % or more, preferably 80 wt % or more, and more preferably 90 wt % or more, based on the total amount of the adhesive.

Examples of other components include an antioxidant, a UV absorber, a photo stabilizer, a diluent, a silane coupling agent, a curing agent, and the like.

An antioxidant is added to prevent deterioration due to oxidation during heating.

Examples of the antioxidant include a phenol-based antioxidant, a sulfur-containing antioxidant, a phosphorus-containing antioxidant, and the like.

Specific examples of the phenol-based antioxidant include monophenols such as 2,6-di-tert-butyl-p-cresol, dibutylhydroxytoluene, butylated hydroxyanisole, 2,6-di-tert-butyl-p-ethylphenol, and stearyl-β-(3,5-di-tert-butyl-4-hydroxyphenyl)propionate; bisphenols such as 2,2'-methylenebis(4-methyl-6-tert-butyl phenol), 2,2'-methylenebis(4-ethyl-6-tert-butylphenol), 4,4'-thiobis(3-methyl-6-tert-butylphenol), 4,4'-butylidenebis(3-methyl-6-tert-butylphenol), and 3,9-bis[1,1-dimethyl-2-{β-(3-tert-butyl-4-hydroxy-5-methylphenyl)propionyloxy}ethyl]-2, 4,8,10-tetraoxaspiro[5,5]undecane; polymer-type phenols such as 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, tetrakis[methylene-3-(3',5'-di-tert-butyl-4'-hydroxyphenyl) propionate]methane, bis[3,3'-bis-(4'-hydroxy-3'-tert-butylphenyl)butylic acid]glycol ester, 1,3,5-tris(3',5'-di-tert-butyl-4'-hydroxybenzyl)-S-triazine-2,4,6-(1H,3H,5H)trion, and tocophenol; and the like.

Examples of a sulfur-containing antioxidant include dilauryl-3,3'-thiodipropionate, dimyristyl-3,3'-thiodipropionate, and distearyl-3,3'-thiodipropionate, and the like.

Examples of the phosphorus-containing antioxidant include phosphite compounds such as triphenylphosphite, diphenylisodecylphosphite, phenyldiisodecylphosphite, tris(nonylphenyl)phosphite, diisodecylpentaerythritolphosphite, tris(2,4-di-tert-butylphenyl)phosphite, cyclic neopentan-tetra-ylbis(octadecyl)phosphite, cyclic neopentan-tetra-ylbis(2,4-di-tert-butylphenyl)phosphate, cyclic neopentan-tetra-ylbis(2,4-di-tert-butyl-4-methylphenyl) phosphate, and bis[2-tert-butyl-6-methyl-4-{2-(octadecyloxycarbonyl)ethyl}phenyl]hydrogen phosphate; oxaphosphaphenanthrene oxides such as 9,10-dihydro-9-oxa-10-phosphaphenanthrene-10-oxide, 10-(3,5-di-tert-butyl-4-hydroxybenzyl)-9,10-dihydro-9-oxa-10-phosphaphenanthrene-10-oxide, and 10-decyloxy-9,10-dihydro-9-oxa-10-phosphaphenanthrene-10-oxide; and the like.

These antioxidants may be used either individually or in combination. The antioxidant is used in an amount of normally 0.01 to 10 parts by weight relative to 100 parts by weight of a polyorganosiloxane compound.

A UV absorber is added to increase weather resistance of the adhesive.

Examples of the UV absorber include salicylic acids such as phenyl salicylate, p-tert-butylphenyl salicylate, and p-octylphenyl salicylate; benzophenones such as 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone, and 2-hydroxy-4-methoxy-5-sulfobenzophenone; benzotriazoles such as 2-(2'-hydroxy-5'-methylphenyl)benzotriazole, 2-(2'-hydroxy-5'-tert-butylphenyl)benzotriazole, 2-(2'-hydroxy-3',5'-di-tert-butylphenyl)benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-3',5'-di-tert-amylphenyl)benzotriazole, and 2-{(2'-hydroxy-3',3",4",5",6"-tetrahydrophthalimidemethyl)-5'-methylphenyl}benzotriazole; hindered amines such as bis(2,2,6,6-tetramethyl-4-piperidyl)sebacate, bis(1,2,2,6,6-pentamethyl-4-piperidyl)sebacate, and bis(1,2,2,6,6-pentamethyl-4-piperidyl)[{3,5-bis(1,1-dimethylethyl)-4-hydroxyphenyl}methyl]butylmalonate; and the like.

These UV absorbers may be used either individually or in combination. UV absorbers are used in an amount of normally 0.01 to 10 parts by weight relative to 100 parts by weight of a polyorganosiloxane compound.

A photostabilizer is added to increase light resistance of the adhesive.

Examples of the photostabilizer include hindered amines such as poly[{6-(1,1,3,3-tetramethylbutyl)amino-1,3,5-triazine-2,4-diyl}{(2,2,6,6-tetramethyl-4-piperidine)imino}hexamethylene{(2,2,6,6-tetramethyl-4-piperidine)imino}], and the like.

These photostabilizers may be used either individually or in combination. The photostabilizers are used in an amount of normally 0.01 to 10 parts by weight per 100 parts by weight of the silsesquioxane compound.

A diluent is added to adjust the viscosity of the adhesive.

Examples of the diluent include glycerol diglycidyl ether, butanediol diglycidyl ether, diglycidyl aniline, neopentyl glycol glycidyl ether, cyclohexanedimethanol diglycidyl ether, alkylene diglycidyl ether, polyglycol diglycidyl ether, polypropylene glycol diglycidyl ether, trimethylolpropane triglycidyl ether, glycerol triglycidyl ether, 4-vinylcyclohexene mono-oxide, vinylcyclohexene dioxide, methylated vinylcyclohexene dioxide, and the like. These diluents may be used either individually or in combination.

A silane coupling agent is added to increase adhesion to the adhesive.

Examples of the silane coupling agent include 3-glycidoxypropyltrimethoxysilane, 3-glycidoxypropyltriethoxysilane, 2-(3,4-epoxycyclohexyl)ethyltrimethoxysilane, 2-(3,4-epoxycyclohexyl)ethyltriethoxysilane, vinyltrimethoxysilane, vinyltriethoxysilane, and the like.

Examples of the curing agent include an acid anhydride, an aromatic amine, a phenol resin, and the like.

Examples of an acid anhydride include tetrahydrophthalic anhydride, methyltetrahydrophthalic anhydride, hexahydrophthalic anhydride, methylhexahydrophthalic anhydride, norbornane-2,3-dicarboxylic anhydride, methylnorbornane-2,3-dicarboxylic anhydride, cyclohexane-1,2,4-tricarboxylic acid, cyclohexane-1,3,5-tricarboxylic acid, cyclohexane-1,3,4-tricarboxylic acid-3,4-anhydride, maleic anhydride, phthalic anhydride, succinic anhydride, dodecylsuccinic anhydride, pyromellitic anhydride, trimellitic anhydride, and the like.

Examples of the aromatic amine include an imidazole such as imidazole, 2-methylimidazole, 2-ethyl-4-methylimidazole, 2-mercaptomethylbenzimidazole, 2-ethylimidazole-4-dithiocarboxylic acid, 2-methylimidazole-4-carboxylic acid, 1-(2-aminoethyl)-2-methylimidazole, 1-(2-cyanoethyl)-2-methylimidazole, 2-phenyl-4,5-dihydroxymethylimidazole, benzimidazole, and 2-ethyl-4-thiocarbamoylimidazole; a pyrazole such as pyrazole and 3-amino-4-cyanopyrazole; triazoles such as 1,2,4-triazole, 2-amino-1,2,4-triazole, 1,2-diamino-1,2,4-triazole, and 1-mercapto-1,2,4-triazole; a triazine such as 2-aminotriazine, 2,4-diamino-6-(6-(2-(2-methyl-1-imidazolyl)ethyl)triazine, and 2,4,6-trimercapto-s-triazine trisodium salt; and the like.

Although the adhesive according to the present invention may contain a curing agent, curing can be carried out flatly without a curing agent. In order to maintain the excellent transparency and heat resistance for a long time, it is preferable not to use a curing agent since the use of a curing agent may cause deterioration.

The adhesive according to the present invention may be produced by mixing one or more other optional components with the polyorganosiloxane compound (I) or the like, for example.

Preferable examples of the material bonded using the adhesive according to the present invention include glass such as soda lime glass and heat resistant hard glass; ceramics such as a silicon wafer; a metal such as iron, copper, aluminum, gold, silver, platinum, chromium, titanium, an alloy thereof, and stainless steel (SUS302, SUS304, SUS304L, SUS309); polyethyleneterephthalate, polybuthyleneterephthalate, polyethylenenaphthalate, polyethylene, polypropylene, polyvinyl chloride, polyvinylidene chloride, polyvinyl alcohol, ethylene-vinyl acetate copolymer, polystyrene, polycarbonate, polymethylpentene, polysulfone, polyether ether ketone, polyether sulfone, polyphenylene sulfide, polyether imide, polyimide, fluororesin, polyamide, acrylic resin, norbornene resin, and cycloolefin resin; an organic-inorganic complex resin such as a glass epoxy resin; and the like.

The materials (e.g., glass and glass, ceramic and ceramic, metal and metal, synthetic resin and synthetic resin, glass and ceramic, glass and metal, glass and synthetic resin, ceramic and metal, ceramic and synthetic resin, metal and synthetic resin) can be firmly bonded using the adhesive according to the present invention.

Specifically, the materials can be firmly bonded by applying the adhesive according to the present invention to one or both of the materials, and drying and curing the adhesive.

The adhesive may be cured by heating the adhesive to a given temperature (100 to 200° C.) optionally applying pressure.

A conductor circuit formed of a metal on a flat surface of an insulating substrate exhibits sufficient adhesion to the substrate when using the adhesive according to the present invention.

The adhesive according to the present invention may be suitably used as an optical adhesive due to excellent transparency. For example, the adhesive is useful for bonding a semiconductor device such as a light-emitting diode to a lead frame, a ceramic case, a substrate, or the like.

EXAMPLES

The present invention is further described below by way of examples.

Note that the present invention is not limited in any way to the following examples.

The following silane compounds were used in the examples.
(1) Silane Compound (1)
1A: 3-chloropropyltrimethoxysilane (manufactured by Tokyo Kasei Kogyo Co., Ltd.)
1B: 3-acetoxypropyltrimethoxysilane (manufactured by AZmax Co., Ltd.)
1C: 2-cyanoethyltrimethoxysilane (manufactured by AZmax Co., Ltd.)
(2) Silane Compound (2)
2A: phenyltrimethoxysilane (manufactured by Tokyo Kasei Kogyo Co., Ltd.)

Examples 1 to 8

Adhesives 1 to 8 were produced by the following production method A or B (see Table 1).
Production Method A:
A 200 ml recovery flask equipped with a stiffing rod was charged with a silane compound (1) and a silane compound (2) shown in Table 1, 20 ml of toluene, and 10 ml of distilled water as a solvent. After then, more 0.10 g (1 mmol) of phosphoric acid (manufactured by Kanto Chemical Co., Inc.) (catalyst) was added and the mixture was stirred at room temperature for 16 hours. A saturated aqueous solution of sodium hydrogencarbonate was then added to neutralize the reaction mixture. 100 ml of ethyl acetate was added to the reaction mixture to separate an organic layer.

The organic layer was washed twice with distilled water, and dried over anhydrous magnesium sulfate. After separating magnesium sulfate by filtration, the filtrate was added dropwise to a large quantity of n-hexane to cause precipitation. The precipitate was separated by decantation. The precipitate was dissolved in tetrahydrofuran (THF) to recover the product. After evaporating THF under reduced pressure using an evaporator, the residue was dried under vacuum to obtain a polyorganosiloxane compound. The product was used as an adhesive.

Production Method B:
A 200 ml recovery flask equipped with a stiffing rod was charged with a silane compound (1) and a silane compound (2) shown in Table 1, 20 ml of toluene, and 10 ml of distilled water. After then, more 0.10 g (1 mmol) of phosphoric acid (manufactured by Kanto Chemical Co., Inc.) (catalyst) was added and the mixture was stirred at room temperature for 16 hours. A saturated aqueous solution of sodium hydrogencarbonate was then added to neutralize the reaction mixture. After allowing the reaction mixture to stand, toluene and water were removed by decantation.

The residue was washed twice with distilled water, and dissolved in 100 ml of 2-butanone. The resulting solution was dried over anhydrous magnesium sulfate. After separating magnesium sulfate by filtration, the filtrate was added dropwise to a large quantity of n-hexane to cause reprecipitation. The precipitate was separated by filtration. The precipitate was dissolved in tetrahydrofuran (THF) to recover the product. After evaporating THF under reduced pressure using an evaporator, the residue was dried under vacuum to obtain a polyorganosiloxane compound. The product was used as an adhesive.

The production method, the types and the amounts of the silane compounds (1) and (2), and the weight average molecular weight (Mw) of the polyorganosiloxane compounds obtained in Examples 1 to 8 are shown in Table 1.

TABLE 1

| | Production method | Silane compound (1) (amount (mmol)) | Silane compound (2) (amount (mmol)) | Adhesive | Mw |
|---|---|---|---|---|---|
| Example 1 | A | 1A (20) | 2A (20) | 1 | 3700 |
| Example 2 | A | 1A (10) | 2A (30) | 2 | 3100 |
| Example 3 | B | 1B (20) | 2A (20) | 3 | 2300 |
| Example 4 | B | 1B (10) | 2A (30) | 4 | 2500 |
| Example 5 | A | 1C (20) | 2A (20) | 5 | 3200 |
| Example 6 | A | 1C (10) | 2A (30) | 6 | 2900 |
| Example 7 | A | 1A + 1B (10 + 10) | 2A (20) | 7 | 3100 |
| Example 8 | A | 1B + 1C (10 + 10) | 2A (20) | 8 | 3300 |

The IR spectrum data (measured by FT-IR (Spectrum One) manufactured by Perkin-Elmer) of the polyorganosiloxane compounds obtained in Examples 1 to 8 is shown in Table 2.

TABLE 2

| | Si—Ph cm$^{-1}$ | | Si—O cm$^{-1}$ | | —CN cm$^{-1}$ | —CO cm$^{-1}$ | —Cl cm$^{-1}$ |
|---|---|---|---|---|---|---|---|
| Example 1 | 741.52 | 700.34 | 1132.97 | 1042.57 | — | — | 648.17 |
| Example 2 | 742.21 | 700.53 | 1133.21 | 1041.87 | — | — | 648.59 |
| Example 3 | 741.67 | 699.83 | 1131.98 | 1042.01 | — | 1737.45 | — |
| Example 4 | 742.24 | 700.42 | 1132.56 | 1042.47 | — | 1737.21 | — |
| Example 5 | 741.89 | 700.36 | 1132.86 | 1042.57 | 2252.57 | — | — |
| Example 6 | 742.28 | 699.86 | 1131.51 | 1041.96 | 2253.02 | — | — |
| Example 7 | 742.31 | 700.37 | 1132.76 | 1042.47 | — | 1736.84 | 647.97 |
| Example 8 | 741.73 | 699.78 | 1132.53 | 1041.51 | 2253.12 | 1736.93 | — |

Comparative Example 1

An epoxy resin composition was obtained by sufficiently mixing 2 g of 3,4-epoxycyclohexylmethyl 3,4-epoxycyclohexanecarboxylate (manufactured by Aldrich), 1 g of 2,2-bis (4-glycidyloxyphenyl)propane (manufactured by Tokyo Kasei Kogyo Co., Ltd.), 3 g of 4-methylcyclohexane-1,2-dicarboxylic anhydride (manufactured by Tokyo Kasei Kogyo Co., Ltd.), and 0.03 g of triphenylphosphine (manufactured by Kanto Chemical Co., Inc.) in a 20 ml glass tube. This composition is referred to as adhesive 9.

(Adhesion Test)

A silicone rubber sheet with a thickness of 1 mm having a hole with a diameter of 3 mm was secured on each adherend. The hole was charged with the adhesives 1 to 9 prepared in Examples 1 to 8 and Comparative Example 1, and the adhesives were cured by heating at 140° C. for 6 hours. The silicone rubber sheet was removed, and the shear adhesion of the adhesives to the adherend was measured using a bond tester (Series 4000 manufactured by Dage Co., Ltd.). The results are shown in Table 3.

TABLE 3

| | | Adhesion (N/3 mm φ) | | | | | | |
|---|---|---|---|---|---|---|---|---|
| | Adhesive | Glass | Silicon wafer | Silver-plated copper plate | Gold-plated copper plate | Polyimide | SS304 | Adherend dependence |
| Example 1 | 1 | 13 | 16 | 15 | 13 | 15 | 17 | None |
| Example 2 | 2 | 28 | 27 | 26 | 27 | 25 | 26 | None |
| Example 3 | 3 | 20 | 21 | 24 | 24 | 22 | 21 | None |
| Example 4 | 4 | 41 | 38 | 39 | 38 | 37 | 40 | None |
| Example 5 | 5 | 18 | 16 | 18 | 17 | 15 | 17 | None |
| Example 6 | 6 | 35 | 36 | 34 | 34 | 33 | 37 | None |
| Example 7 | 7 | 21 | 23 | 20 | 21 | 19 | 22 | None |
| Example 8 | 8 | 36 | 35 | 33 | 33 | 32 | 35 | None |
| Comparative Example 1 | 9 | 108 | 55 | 0 | 9 | 21 | 38 | Observed |

As shown in Table 3, the adhesives of Examples 1 to 8 exhibited excellent adhesion to various materials (independent of the adherend). On the other hand, the adhesive 9 of Comparative Example 1 showed adherend dependence.

The invention claimed is:

1. A method of bonding materials, said method comprising applying an adhesive for bonding said materials, followed by curing the adhesive, wherein the adhesive comprises a polysilsesquioxane compound having a ladder structure and including a repeating unit shown by the following formula (I) in the molecule:

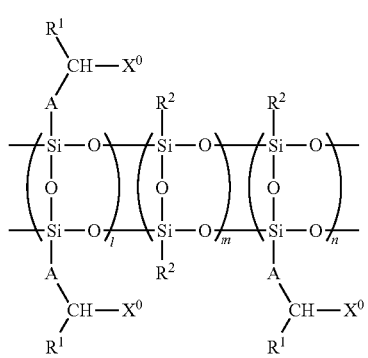

(I)

wherein A represents a single bond or a linking group, $R^1$ represents a hydrogen atom or an alkyl group having, 1 to 6 carbon atoms, $X^0$ represents a halogen atom, a group shown by OG (wherein G represents a protecting group for a hydroxyl group), or a cyano group, $R^2$ represents a substituted or unsubstituted phenyl group, or an alkyl group having 1 to 20 carbon atoms, l, m, and n are individually 0 or an arbitrary natural number, provided that l and n are not 0 at the same time.

A and A, $X^0$ and $X^0$, $R^1$ and $R^1$, $R^2$ and $R^2$ may be either the same or different from each other, and, when l, m, and n are 2 or more, the repeating units shown by the following formulas (i), (ii), and (iii) may be either the same or different from each other,

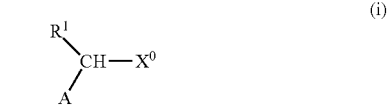

(i)

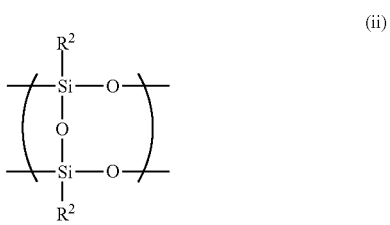

(ii)

(iii)

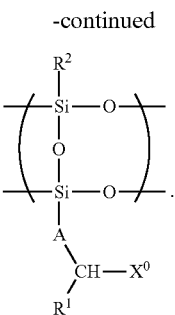

2. The method according to claim 1, wherein the polysilsesquioxane compound is obtained by reacting a silane compound (1) shown by $X^0$—$CH(R^1)$-A-$Si(OR^3)_p(X^1)_{3-p}$ (wherein $X^0$, $R^1$, and A are the same as defined above, $R^3$ represents an alkyl group having 1 to 6 carbon atoms, $X^1$ represents a halogen atom, and p is an integer from 0 to 3) and a silane compound (2) shown by $R^2Si(OR^4)_q(X^2)_{3-q}$ (wherein $R^2$ is the same as defined above, $R^4$ represents an alkyl group having 1 to 6 carbon atoms, $X^2$ represents a halogen atom, and q is an integer from 0 to 3) in a molar ratio of 10:90 to 100:0 (=silane compound (1):silane compound (2)) in the presence of a catalyst.

3. The method according to claim 2, wherein $X^0$ represents a chlorine atom, an acetoxy group, or a cyano group.

4. The method according to claim 2, wherein the adhesive is used to bond at least one material selected from the group consisting of glass, a ceramic, a metal, and a synthetic resin.

5. The method according to claim 4, wherein the metal is at least one metal selected from the group consisting of copper, aluminum, gold, platinum, and alloys thereof.

6. A method of bonding materials, said method comprising applying an adhesive or bonding said materials, followed by curing the adhesive,
wherein said adhesive comprises a polyorganosiloxane compound as a main component, the polyorganosiloxane compound being obtained by reacting a silane compound (1) and a silane compound (2) in a molar ratio of 5:95 to 100:0 (=silane compound (1): silane compound (2)) in the presence of a catalyst;

$$X^0\text{—}CH(R^1)\text{-A-}Si(OR^3)_p(X^1)_{3-p} \quad (1)$$

wherein A represents a single bond or a linking group,
$R^1$ represents a hydrogen atom or an alkyl group having 1 to 6 carbon atoms,
$X^0$ represents a halogen atom, a group shown by OG (wherein G represents a protecting group for a hydroxyl group), or a cyano group,
$R^3$ represents an alkyl group having 1 to 6 carbon atoms.
$X^1$ represents a halogen atom, and
p is an integer from 0 to 3;

$$R^2Si(OR^4)_q(X^2)_{3-q} \quad (2)$$

wherein $R^2$ represents a substituted or unsubstituted phenyl group, or an alkyl group having, 1 to 20 carbon atoms.
$R^4$ reprsents an alkyl group having 1 to 6 carbon atoms,
$X^2$ represents a halogen atom, and
q is an integer from 0 to 3.

7. The method according to any one of claims 2 to 3, wherein A represents an alkylene group having 1 to 10 carbon atoms.

* * * * *